(12) United States Patent
Kaechi

(10) Patent No.: US 11,954,947 B2
(45) Date of Patent: Apr. 9, 2024

(54) MONITORING SYSTEM FOR WORKING MACHINE

(71) Applicant: KUBOTA CORPORATION, Osaka (JP)

(72) Inventor: Shuya Kaechi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 857 days.

(21) Appl. No.: 17/062,962

(22) Filed: Oct. 5, 2020

(65) Prior Publication Data

US 2021/0035380 A1   Feb. 4, 2021

Related U.S. Application Data

(63) Continuation of application No. PCT/JP2019/011226, filed on Mar. 18, 2019.

(30) Foreign Application Priority Data

Apr. 10, 2018 (JP) .................. 2018-075639

(51) Int. Cl.
*G07C 5/00* (2006.01)
*B60K 35/00* (2006.01)
(Continued)

(52) U.S. Cl.
CPC .............. *G07C 5/008* (2013.01); *B60K 35/00* (2013.01); *B60Q 9/00* (2013.01); *B60R 25/102* (2013.01); *B60R 25/30* (2013.01); *G01M 17/007* (2013.01); *G06Q 50/02* (2013.01); *B60K 35/22* (2024.01); *B60K 35/28* (2024.01); *B60K 2360/178* (2024.01); *G06Q 50/265* (2013.01)

(58) Field of Classification Search
CPC .. G07C 5/008; B60K 35/00; B60K 2360/178; B60K 35/28; B60K 35/22; B60Q 9/00;
(Continued)

(56) References Cited

U.S. PATENT DOCUMENTS 6,204,772 B1   3/2001 DeMay et al.
11,567,498 B2 *  1/2023 Unesaki .............. A01B 69/008
(Continued)

FOREIGN PATENT DOCUMENTS

EP    1 018 457 A1   7/2000
FR    2922673 A1    4/2009
(Continued)

OTHER PUBLICATIONS

International Search Report issued in International Pat. Appl. No. PCT/JP2019/011226, dated May 21, 2019, along with an English translation thereof.

*Primary Examiner* — Aryan E Weisenfeld
(74) *Attorney, Agent, or Firm* — Greenblum & Bernstein, P.L.C.

(57) ABSTRACT

A monitoring system for a working machine, includes a first communicator to communicate in wireless, the first communicator being provided on the working machine including a working device and a traveling device, a second communicator to communicate with the first communicator in wireless, the second communicator being provided on a monitoring device installed in an agricultural field, a monitor to monitor the agricultural field, the monitor being provided on the monitoring device, a judgment analyzer to judge whether the working machine is in a monitoring area based on intensities of signals of the first communicator and the second communicator, and an instruction controller to instruct the monitor to start monitoring when the judgment analyzer determines that the working machine is in the monitoring area of the monitor.

17 Claims, 11 Drawing Sheets

(51) Int. Cl.
*B60Q 9/00* (2006.01)
*B60R 25/102* (2013.01)
*B60R 25/30* (2013.01)
*G01M 17/007* (2006.01)
*G06Q 50/02* (2012.01)
*B60K 35/22* (2024.01)
*B60K 35/28* (2024.01)
*G06Q 50/26* (2012.01)

(58) Field of Classification Search
CPC .... B60R 25/102; B60R 25/30; G01M 17/007; G06Q 50/02; G06Q 50/265
See application file for complete search history.

(56) References Cited

U.S. PATENT DOCUMENTS

| | | |
|---|---|---|
| 2005/0017855 A1 | 1/2005 | Harvey |
| 2007/0203812 A1 | 8/2007 | Donnelli et al. |
| 2010/0225892 A1 | 9/2010 | Hoogenraad |
| 2013/0311218 A1 | 11/2013 | Maeda et al. |
| 2017/0257552 A1 | 9/2017 | Kennair, Jr. |
| 2017/0367252 A1 | 12/2017 | Sakaguchi et al. |

FOREIGN PATENT DOCUMENTS

| | | |
|---|---|---|
| JP | 2002-334386 A | 11/2002 |
| JP | 2003-335137 A | 11/2003 |
| JP | 2005-145602 A | 6/2005 |
| JP | 2007-102570 A | 4/2007 |
| JP | 2008-155862 A | 7/2008 |
| JP | 2011-239693 A | 12/2011 |
| JP | 2012-155432 A | 8/2012 |
| JP | 2012-181633 A | 9/2012 |
| JP | 2013-126829 A | 6/2013 |
| JP | 2017-152909 A | 8/2017 |
| JP | 2017-228155 A | 12/2017 |
| WO | 2017/057275 A1 | 4/2017 |
| WO | WO2017057275 * | 4/2017 ............... G07C 3/02 |

* cited by examiner

MONITORING SYSTEM FOR WORKING MACHINE

CROSS-REFERENCE TO RELATED APPLICATIONS

The present application is a continuation application of International Application No. PCT/JP2019/011226, filed Mar. 18, 2019, which claims priority to Japanese Patent Application No. 2018/075639, filed Apr. 10, 2018. The contents of these applications are incorporated herein by reference in their entirety.

BACKGROUND OF THE INVENTION

Field of the Invention

The present invention relates to a monitoring system for a working machine.

Description of Related Art

A method of preventing theft of a vehicle by issuing an alarm in response to changes in an image captured by an on-board camera is previously known as Japanese Unexamined Patent Publication No. 2008-155862.

The car security device of Japanese Unexamined Patent Publication No. 2008-155862 is characterized by including an on-board camera, a motion detector portion configured to detect whether movement has occurred in an image captured by the on-board camera, a controller portion configured to drive the on-board camera at regular intervals and to take a predetermined countermeasure when a movement is detected in the image captured by the on-board camera.

SUMMARY OF THE INVENTION

A monitoring system for a working machine, includes a first communicator to communicate in wireless, the first communicator being provided on the working machine including a working device and a traveling device, a second communicator to communicate with the first communicator in wireless, the second communicator being provided on a monitoring device installed in an agricultural field, a monitor to monitor the agricultural field, the monitor being provided on the monitoring device, a judgment analyzer to judge whether the working machine is in a monitoring area based on intensities of signals of the first communicator and the second communicator, and an instruction controller to instruct the monitor to start monitoring when the judgment analyzer determines that the working machine is in the monitoring area of the monitor.

A monitoring system for a working machine, includes a first communicator to communicate in wireless, the first communicator being provided on the working machine including a working device and a traveling device, a second communicator to communicate with the first communicator in wireless, the second communicator being provided on a monitoring device installed in an agricultural field, a monitor to monitor the agricultural field, the monitor being provided on the monitoring device, a judgment analyzer to judge whether the working machine is in a monitoring area based on intensities of signals of the first communicator and the second communicator, and an instruction controller to instruct the monitor to start monitoring when the judgment analyzer determines that the working machine is in the monitoring area of the monitor. The instruction controller instructs the monitor to stop monitoring when the judgment analyzer determines that the working machine is in the monitoring area and a prime mover provided in the working machine is in operation.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
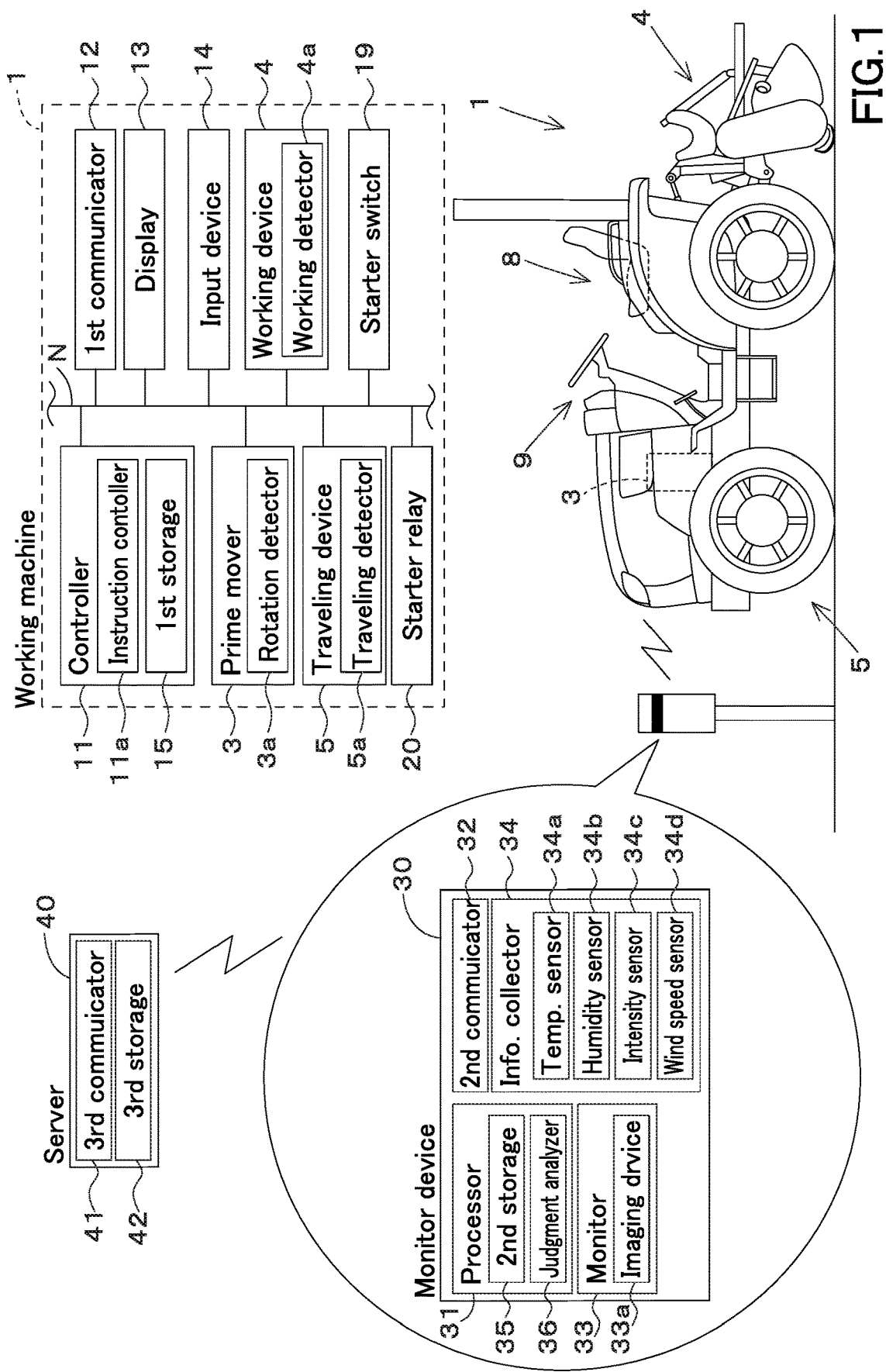
FIG. 1 is an overall view of a monitoring system for a working machine.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

FIG. 1 is an overall view of a monitoring system for a working device 1. The monitoring system for the working device 1 is a system for monitoring the working device 1.

The monitoring system for the working device 1 is a monitoring system of the working device 1, wherein the monitoring device (field server) 30 installed in the agricultural field 50 detects a dynamic abnormality, such as an intrusion of a suspicious person or the like into the monitored area, or a movement of the working device 1 out of the monitored area, by dispatching security guards, monitoring drones, and the like to the monitoring device 30 or the vicinity of the monitoring device 30, thereby confirming any abnormality and warning suspicious persons.

The working device 1 is agricultural machinery and the like that performs work including plowing and harvesting crops in the agricultural field 50, and the agricultural machinery is a tractor, a combine, a rice transplanter and the like. The tractor 1, which is one of the agricultural machinery, will be taken as an example below. The tractor 1 can be provided with a working device 4 such as, for example, a cultivator, a mower, a tedder, a rake, and the like.

First, the overall configuration of the tractor 1 will be described.

As shown in FIG. 1, the tractor 1 is provided with a traveling vehicle (traveling body) having a traveling device 5 and a prime mover (driver portion) 3, such as a diesel engine and the like.

The tractor 1 is provided with a controller 11, a first communicator 12, a display 13, and an input device 14. The tractor 1 is also provided with a rotating-speed detector 3a, a traveling detector 5a, a working detector 4a, a starter switch 19, and a starter relay 20. The prime mover 3, the working device 4, the traveling device 5, the controller 11, the first communicator 12, the display 13, the input device 14, the rotating-speed detector 3a, the working detector 4a, the traveling detector 5a, the starter switch 19, and the starter relay 20 are connected by an on-board network N such as CAN.

In other words, for example, the devices connected by the on-board network N, including the prime mover 3, the working device 4 and the traveling device 5, can output and acquire information between the devices on the on-board network N. For example, the controller 11 can obtain the number of revolutions of the prime mover 3 from the rotating-speed detector 3a. The controller 11 can also obtain the vehicle speed of the traveling device 5 from the traveling detector 5a. The controller 11 can also acquire information such as the operating state of the working device 4 from the working detector 4a.

The controller 11 includes a CPU or the like and performs various controls relating to the working device 1. The controller 11 also has a first storage portion 15. The first storage portion 15 is a non-volatile memory or the like and stores various information. The first storage portion 15 stores, for example, various application software.

The first communicator 12 is, for example, a device configured to communicate with a second communicator 32 installed in the monitoring device 30. The first communicator 12 is a device configured to communicate in a short distance or a long distance. For example, the first communicator 12 communicates wirelessly with the second communicator 32 with Bluetooth (a registered trademark) Low Energy and the like in the Bluetooth (a registered trademark) specification of the IEEE802.15.1 series of communication standards. Hereinafter, for convenience of explanation, Bluetooth (a registered trademark) Low Energy will be referred to as "BLE".

The display 13 is provided around the operator seat 8 of the working machine 1 and is a screen for displaying various information about the working machine 1. The display 13 can display, for example, the number of revolutions of the prime mover 3, the speed of the traveling device 5, and the like. In particular, the display 13 can display screens D1 to D6 as shown in FIG. 3A to FIG. 5.

The input device 14 is a code input device 14 such as a numeric keypad or the like capable of entering a pass code (certification information). When an operator operates the input device 14 and inputs a pass code, the pass code is output as a signal. The signal output from the input device 14 is input to the controller 11. The configuration may be such that the pass code can be entered by operating the display 13 in the same manner as a numeric keypad, for example, the display 13 may be configured to serve as an input device 14.

In particular, the display portion 13 provided in the working device 1 may be like a touch panel on which a numeric keypad or the like similar to the input device 14 is displayed and a certification code is entered from the display portion 13. In such a case, the display 13 outputs a signal based on the pass code entered into the display 13 to the controller 11.

The rotating-speed detector 3a is a device for detecting the number of revolutions of the prime mover 3. In other words, the rotating-speed detector 3a can detect whether the prime mover 3 is starting or not. The rotating-speed detector 3a is provided in the prime mover 3 and includes a sensor or the like that detects the number of revolutions of the prime mover 3.

The rotating-speed detector 3a can output a signal based on the number of revolutions detected by the rotating-speed detector 3a to the controller 11 through the on-board network N. In other words, the controller 11 can obtain the number of revolutions of the prime mover 3 from the rotating-speed detector 3a. The rotating-speed detector 3a can be any type of the rotating-speed detector 3a that is configured to detect whether the prime mover 3 is starting or not.

The working detector 4a is a device for detecting a state of an actuator and the like provided in the working device 4. In detail, the working detector 4a detects, for example, the number of rotations of the actuator provided in the working device 4, the rotational speed of the actuator, and the like.

In other words, the working detector 4a can detect whether the working device 4 is operating or not. The working detector 4a is provided in the working device 4 and includes a sensor or the like that detects the number of rotations of the actuator, the rotational speed of the actuator, and the like. The working detector 4a can output a signal based on the information detected by the working detector 4a to the controller 11 through the on-board network N. The working detector 4a can also output a signal based on the information detected by the working detector 4a to the controller 11.

In other words, the controller 11 can obtain the status of the working device 4 from the working detector 4a. The working detector 4a can be any type of working detector 4a that is capable of detecting whether the working device 4 is operating or not.

The traveling detector 5a is a device that detects the traveling speed (ground speed) of the working machine 1, that is, the speed of the traveling device 5. In other words, the traveling detector 5a can detect whether the traveling device 5 is operating or not. The traveling detector 5a is provided in the traveling device 5 and includes a vehicle speed sensor or the like that detects the speed of the working device 1.

The traveling detector 5a can output a signal based on the traveling speed detected by the traveling detector 5a to the controller 11 through the on-board network N. In other words, the controller 11 can obtain the travel speed of the working machine 1 from the traveling detector 5a. The traveling detector 5a can be any type of unit capable of detecting whether the traveling device 5 is operating or not.

The starter switch 19 is a switch for starting the prime mover 3. When an operator inserts an engine key into a key cylinder provided around the operator seat and turns the engine key, the starter switch 19 outputs a signal to the starter relay 20 to start the prime mover.

The starter relay 20 is a component for starting the prime mover 3. When a signal for starting the prime mover is input from the starter switch 19 to the starter relay 20, the starter relay 20 starts the prime mover 3. The starting of the prime mover, which is one of driving of the prime mover, is not limited to a mechanical type (key cylinder type) where the engine key is inserted into the key cylinder and the starter relay 20 is turned on, but may be a smart entry type where the starting of the prime mover is permitted or prohibited by radio communication.

The monitoring device (field server) 30 is a device for collecting information about the agricultural field 50 and the crops to be grown in the agricultural field 50. The monitoring device 30 is installed in the agricultural field 50 where the crops are grown. The monitoring device 30 has a processor portion 31, a second communicator 32, a monitor 33, and an information collector 34.

The processor portion 31 includes a CPU and the like, and processes the information (data) acquired by the monitor 33 and the information collector 34. The processor portion 31 also has a second storage portion 35. The second storage portion 35 is a non-volatile memory or the like, and stores various information, including information processed by the processor portion 31. The third communicator 41 may, for example, communicate wirelessly with the second communicator 32 by means of a cellular phone communication network, a data communication network, a cellular phone communication network, or the like.

The third communicator 41 receives a call signal sent by the second communicator 32 of the monitoring device 30. Based on the call signal and the location information of the monitoring device 30 stored in the third storage portion 42, it calls the guards, the monitoring drone and the like to the agricultural field 50. The server 40 does not call the guards, the monitoring drone and the like, but may be configured to notify the operator of the alarm and the location information of the monitoring device 30 to a mobile terminal such as a PC or a smart phone possessed by the operator.

The second communicator 32 is, for example, a device for communicating with the first communicator 12 and the server 40 installed in the working machine 1. The second communicator 32 is a device that communicates over short and long distances. The second communicator 32 communicates wirelessly with the first communicator 12, for example, by BLE or the like. The second communicator 32 also communicates wirelessly with the server 40 and the like by means of a cellular phone communication network, a data communication network, a cellular phone communication network, and Wi-Fi (Wireless Fidelity, a registered trademark) of the IEEE 802.11 series, which is a communication standard, and the like.

The monitor 33 includes electrical and electronic components, a program stored in the second storage portion 35, and the like, and monitors a condition in the agricultural field 50, including the working machine 1.

In the following description, it is referred to as "monitoring" that the monitor 33 "performs the imaging by the imaging portion 33a" and "obtains the result of the judgment of the judgment analyzer 36". The monitor 33 has an imaging portion (imaging device) 33a. The imaging portion 33a is an image sensor such as a CCD or CMOS sensor that captures a state in the agricultural field 50 and outputs the image data.

The imaging portion 33a is mounted at a position where, for example, the area including the working machine 1 and the crop is the imaging area. The imaging portion 33a, for example, captures a plurality of images by a single imaging operation. The imaging portion 33a may also capture video images including audio.

The information collector 34 includes at least one or more of, for example, an air temperature sensor 34a, a humidity sensor 34b, an light intensity sensor 34c, and a wind speed sensor 34d. The temperature sensor 34a is a sensor that measures, for example, the temperature in the agricultural field 50 (outdoor temperature) as a change in resistance of the thermistor.

The humidity sensor 34b is a sensor that measures, for example, the humidity of the soil within the agricultural field 50 based on the change in resistance of the current flowing through the soil. The light intensity sensor 34c is a sensor for measuring intensity of light within the agricultural field 50, for example, based on the light emitted on the infrared light emitting device. The wind speed sensor 34d is a sensor that measures the wind speed within the agricultural field 50.

The information collector 34 is not limited to the temperature sensor 34a, the humidity sensor 34b, the light intensity sensor 34c, and the wind speed sensor 34d, but may be any sensor that collects information within the agricultural field 50. In other words, by using a field server having the information collector 34 and monitoring the condition of the agricultural field 50, the working device 1 can be monitored.

The server 40 has a third communicator 41 and a third storage portion 42. The third communicator 41 allows the server 40 to communicate wirelessly with the monitoring device 30 and the outside. The third communicator 41, for example, communicates wirelessly with the second communicator 32 of the monitoring device 30 and the outside by means of a cellular phone communication network, a data communication network, a cellular phone communication network, and Wi-Fi of the IEEE 802.11 series, which is a communication standard.

The third storage portion 42 is a non-volatile memory or the like, and stores various information, including information received by the third communicator 41 and position information of the monitoring device 30.

The configuration of the position information of the monitoring device 30 may be stored in the third storage portion 42 in advance, or the monitoring device 30 may be provided with a position detector, and the position information detected by the position detector is transmitted from the second communicator 32 to the third communicator 41.

The position detector is a device that detects its own position (positioning information including latitude and longitude) by a satellite positioning system (Global Positioning System, Galileo, GLONASS, and the like).

Now, the monitoring system for the working machine 1 can be switched between a normal mode and a monitoring mode. The normal mode is the mode used when the operator is on board the working machine 1 and does not require external monitoring. The monitoring mode is a mode for monitoring the working machine 1 when the operator is parking the working machine 1 in the agricultural field 50, for example.

The switching between the normal mode and the monitoring mode is based on whether the working machine 1 is parked and whether the working machine 1 is within the monitoring area (monitoring range) of the monitoring device 30.

In particular, the processor portion 31 has the judgment analyzer 36. The judgment analyzer 36 includes a program or the like stored in the second storage portion 35, and determines whether the working device 1 is within the monitoring area of the monitor 33. The judgment analyzer 36 is possessed, for example, by the processor portion 31 of the monitoring device 30.

In particular describing the judgment analyzer 36, the judgment analyzer 36 determines whether the working device 1 is in the monitorable area based on, for example, a received signal strength indicator (RSSI). In particular, based on the monitorable area of the monitor 33, the distance between the first communicator 12 and the second communicator 32 is calculated according to a preset threshold of the signal strength. Thereby, it is determined whether the working device 1 is in the monitorable area or not.

In other words, the judgment analyzer 36 determines whether the working device 1 is within the monitoring area based on the strength of the signals of the first communicator 12 and the second communicator 32. The judgment analyzer 36 may be constituted of the controller 11 of the working device 1 or by the server 40, or any other configuration. The result of the determination of the judgment analyzer 36 is transmitted from the second communicator 32 to the first communicator 12.

The processor portion 31 corresponds to the identification information of the monitoring device 30 and each of the information acquired by the monitor 33 and the information collector 34.

In particular, for example, when the second communicator 32 receives a first warning signal from the first communicator 12 or when the second communicator 32 receives a second warning signal that is output when the monitor 33 obtains information and detects an abnormality, the processor portion 31 associates the first warning signal or the second warning signal with the monitoring device 30 as a signal for calling the outside guards, the monitoring drone and the like.

In detail, the processor portion 31 obtains the first and second warning signals from the second communicator 32, and maps the first or second warning signal to the identification information of the monitoring device 30 as a call signal. The processor portion 31 outputs the calling signal to the second communicator 32.

The control device 11 determines whether the input pass code is a normal one or not based on the information stored in the first storage portion 15. If the pass code is an unnormal one, the first communicator 12 obtains a first warning signal, which is a signal that the pass code is unnormal. The first communicator 12 transmits the first warning signal to the second communicator 32 of the monitoring device 30.

The controller 11 has an instruction controller 11a. The instruction controller 11a includes a program or the like stored in the first storage portion 15, and instructs the monitor 33 to monitor the working device 1 when the working device 1 is in the monitorable area. The instruction controller 11a is, for example, possessed by the controller 11 of the working machine 1.

Specifically describing the instruction controller 11a, when the first communicator 12 receives the result of the determination that the working machine 1 is in the monitorable area, the first communicator 12 and the second communicator 32 output a start signal, which is a signal instructing the monitor 33 to start monitoring, via the first communicator 12 and the second communicator 32. When the second communicator 32 receives the start signal, the monitor 33 starts monitoring.

In other words, the monitor 33 begins to capture images by the imaging portion 33a of the monitor 33 and to acquire the results of the decision from the judgment analyzer 36. This enables the monitoring of the working device 1 after determining whether or not the working device 1 is within the monitoring area of the monitoring device 30.

Therefore, the working device 1 can be monitored when the working device 1 is within the monitoring area, that is, when the monitoring of the monitoring device 30 is effective. The instruction controller 11a instructs the monitor 33 to terminate the monitoring when the prime mover 3 starts when the monitor 33 is monitoring the working device 1.

In particular, in the case where the monitor 33 performs the monitoring, the controller 11 determines whether the prime mover 3 has started based on the signal output from the starter switch 19 or the signal output from the rotating-speed detector 3a. When the controller 11 determines that the prime mover 3 has started, a termination signal is transmitted from the controller 11 to the monitor 33 via the first communicator 12 and the second communicator 32, indicating the end of the monitoring.

In other words, the indication portion 11a instructs the monitor 33 to terminate the monitoring once started. The instruction controller 11a also instructs the monitor 33 to detect an abnormality at regular intervals in the state where the monitor 33 is monitoring. In particular, the instruction controller 11a transmits a status confirmation signal to the monitor 33 via the first communicator 12 and the second communicator 32 at regular intervals.

The first communicator 12 transmits to the second communicator 32, for example, a first warning signal, which is a signal indicating that the pass code entered into the input device 14 is unnormal, when the pass code is unnormal. When the control device 11 determines that the working machine 1 has stopped, the first communicator 12 transmits, to the second communicator 32, a parking signal, which is a signal indicating that the working machine 1 has stopped.

When the second communicator 32 receives the first warning signal from the first communicator 12 or acquires the second warning signal that is output when the monitor 33 detects an abnormality, the second communicator 32 outputs the first and second warning signals to the processor portion 31. When the second communicator 32 obtains a call signal from the processor portion 31, the second communicator 32 transmits the call signal to the third communicator 41.

In the case of monitoring the working machine 1, the monitor 33 detects a moving object in the agricultural field 50, including the area around the work machine, based on the image data output by the imaging portion 33a. Thereby, the monitor 33 determines whether or not there is an abnormality, such as the presence of an intruder attempting to steal the working device 1, in the vicinity of the working machine.

In addition, the monitor 33 obtains from the judgment analyzer 36 the result of determining whether or not the working device 1 is within the monitoring area, and determines whether or not there is an abnormality, such as the working device 1 being moved. When the monitor 33 acquires a start signal indicating the start of monitoring, the monitor 33 starts the monitoring.

In particular, the monitor 33 starts imaging with the imaging portion 33a. The monitor 33 also begins to acquire a judgment result from the judgment analyzer 36 as to whether the working device 1 is within the monitoring area or not. When the monitor 33 obtains a status confirmation signal to confirm whether or not there is an abnormality in the agricultural field 50, the monitor 33 detects an abnormality whether or not an abnormality has occurred based on the image output by the imaging portion 33a and the judgment result, as described above.

If the monitor 33 determines that there is an abnormality, the monitor 33 outputs a second warning signal based on the abnormality to the second communicator 32. When the monitor 33 obtains the start signal, the monitor 33 may be configured to "capture an image with the imaging portion 33a", "acquire a judgment result from the judgment analyzer 36", and "detect the abnormality".

In other words, the configuration may be such that the monitor 33 includes in the "monitoring" the actions up to the point of detecting the abnormality based on the "imaging by the imaging portion 33*a*" and the "judgment result".

Figure 2A:
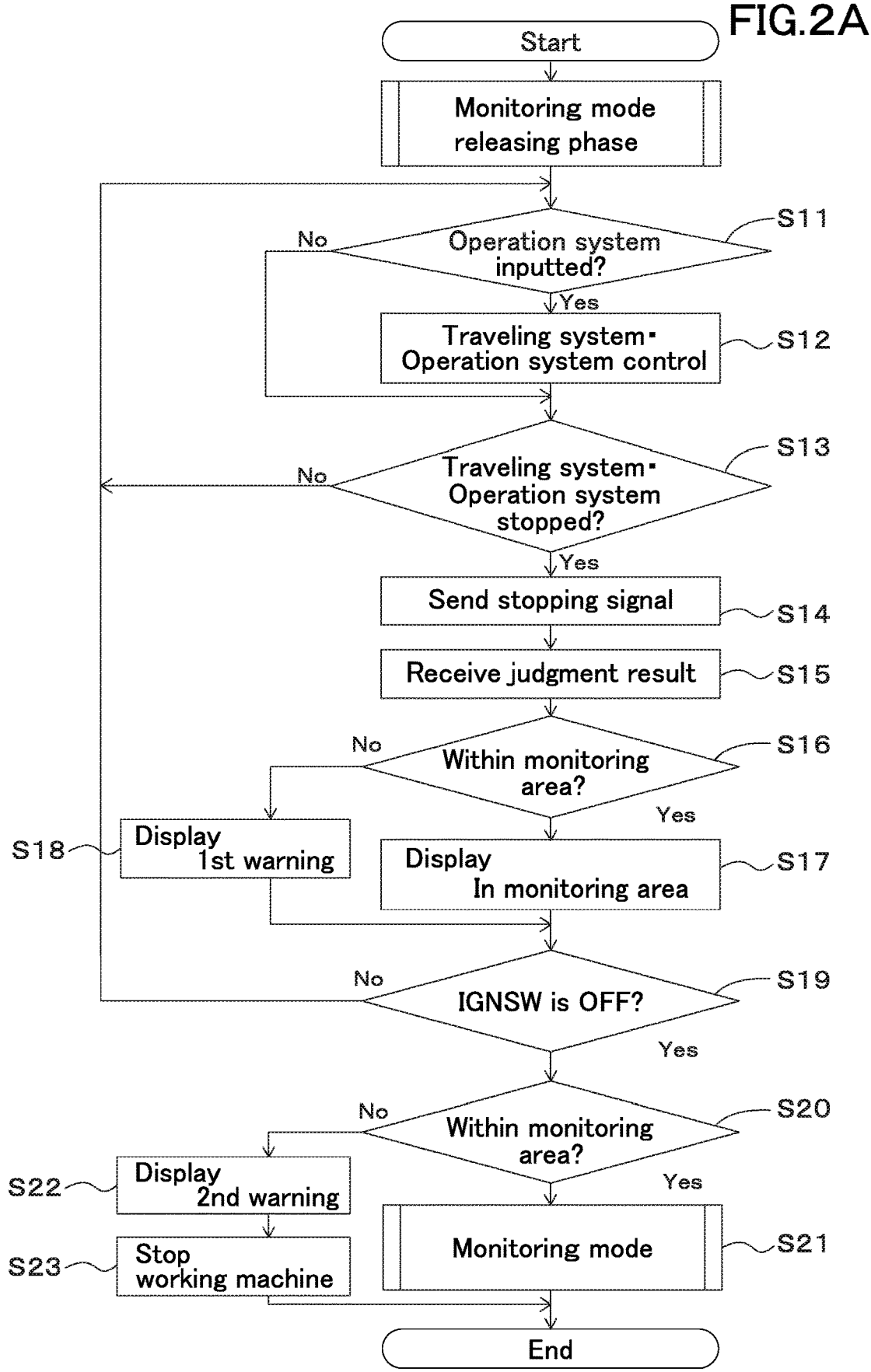
FIG. 2A is a view showing a sequential flow of the monitoring system in the working machine.

A series of operations of the monitoring system in the working device 1 and the monitoring device 30 will be described below using FIG. 2A.

After the process of canceling the monitoring mode of the working device 1, in a state where the monitoring mode is canceled, for example, in the normal mode, the controller 11 checks whether the operation member 9 operating the working device 4 and the traveling device 5 is operated (step S11). In particular, the controller 11 confirms whether the operation member 9 is inputting a signal based on the operation of the operation member 9 to the controller 11.

When a signal based on the operation of the operation member 9 is acquired, that is, when the operation member 9 is operated, the controller 11 controls the working device 4 and the traveling device 5 based on the operation of the operation member 9 (step S12).

When no signal based on the operation of the operation member 9 is acquired, for example, when the operation member 9 is not operated, the controller 11 checks whether the working device 4 and the traveling device 5 have stopped operating (step S13).

In particular, the controller 11 confirms whether the operation of the actuators and the like possessed by the working device 4 is stopped based on the signals input to the controller 11 from the working detector 4*a* through the on-board network N. The controller 11 confirms whether the operation of the actuators and the like possessed by the working device 4 has been stopped.

Based on the signal obtained from the working detector 4*a*, the controller 11 determines, for example, if the rotation speed of the actuator or the like is zero, the operation of the working device 4 is stopped. On the other hand, the controller 11 determines that the working device 4 is operating when the rotational speed of the actuator or the like is other than zero, based on the signal acquired from the working detector 4*a*.

The controller 11 also confirms whether the vehicle speed of the traveling device 5 is zero based on the signal input to the controller 11 from the traveling detector 5*a* through the on-board network N. The controller 11 checks whether the vehicle speed of the traveling device 5 is zero.

The controller 11 determines that the operation of the traveling device 5 is stopped if the traveling speed of the traveling device 5 is zero based on the signal obtained from the traveling detector 5*a*. On the other hand, the controller 11 determines that the traveling device 5 is operating if the traveling speed of the traveling device 5 is other than zero, based on the signal obtained from the traveling detector 5*a*.

When the controller 11 confirms the cessation of operation of the working device 4 and the traveling device 5, the first communicator 12 transmits a parking signal to the second communicator 32 as a signal to indicate that the working device 1 has stopped (step S14).

When the second communicator 32 receives the parking signal, the judgment analyzer 36 determines whether the working machine 1 is within the monitoring area. The first communicator 12 obtains the result of judgment (step S15).

In detail, the judgment analyzer 36 obtains a threshold value previously stored in the second storage portion 35. The judgment analyzer 36 determines whether or not the working device 1 is within the monitoring area based on the strength of the signals of the first communicator 12 and the second communicator 32 and the threshold value.

In other words, if the strength of the signals of the first communicator 12 and the second communicator 32 is greater than the relevant threshold value, it is determined that the working device 1 is within the monitoring area. On the other hand, if the intensity of the signals of the first communicator 12 and the second communicator 32 is less than the threshold, it is determined that the first communicator 12 and the second communicator 32 are outside the monitoring area.

The judgment analyzer 36 outputs the result of the determination to the second communicator 32. The second communicator 32 transmits the acquired result of the judgment to the first communicator 12. The first communicator 12 outputs the received judgment result to the display 13. The judgment result is stored in the first storage portion 15.

Based on the judgment results stored in the first storage portion 15, the display 33 displays the followings (step S16), respectively.

Figure 3A:
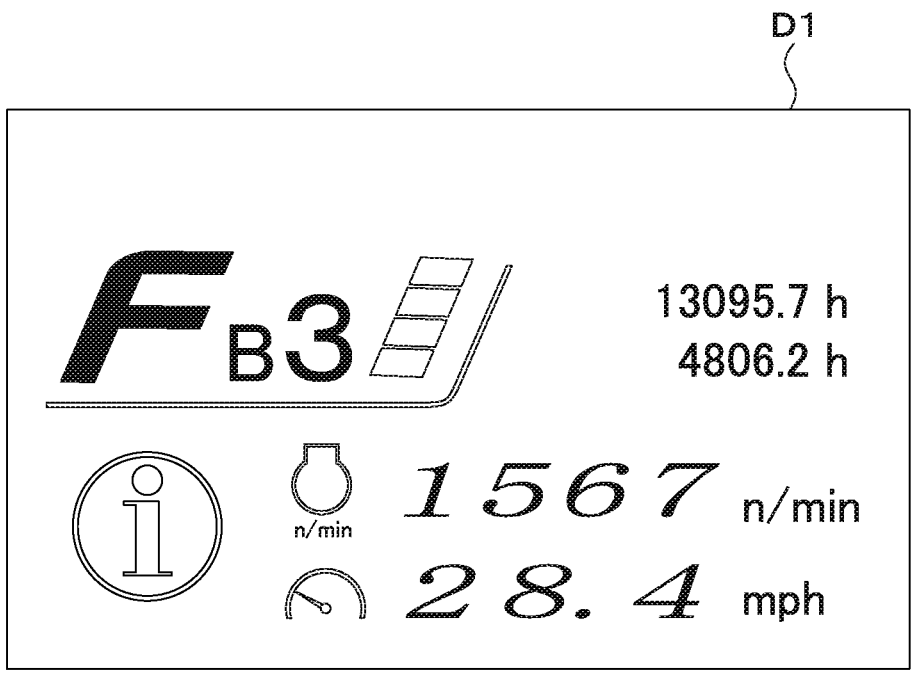
FIG. 3A is a view showing a normal screen displayed on a display.
Figure 3B:
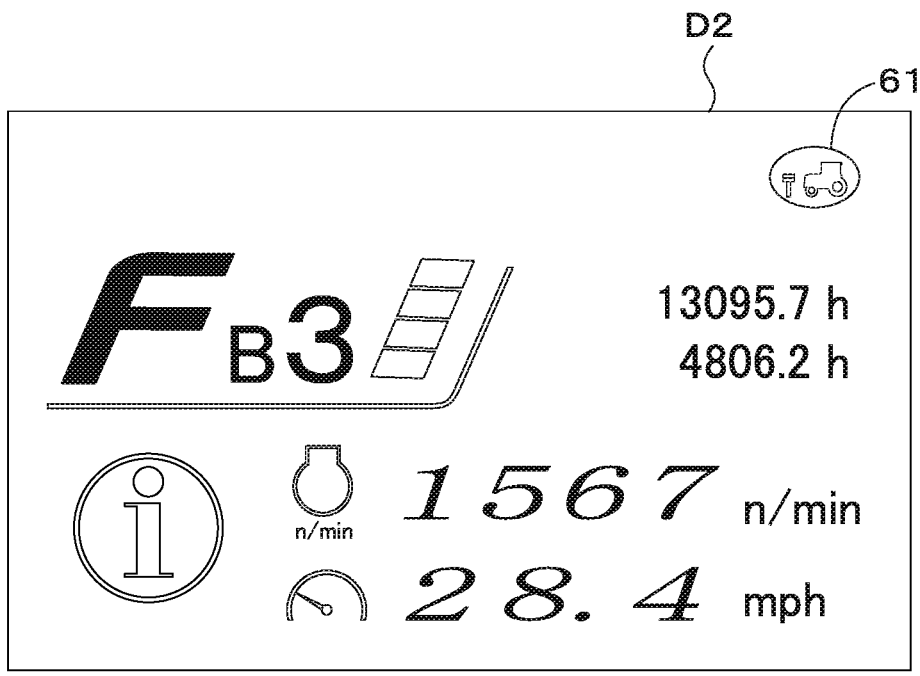
FIG. 3B is a view showing a screen displayed on the display, which represents the working machine is in a monitoring area.

When the working machine 1 is within the monitoring area, as shown in FIG. 3B, the display 13 displays an icon 61 on a portion of the normal screen D1 indicating that the working machine 1 is within the range of the monitoring device 30 (step S17).

For example, the display 13 transitions from the normal screen D1 to the screen D2 including the icon 61 indicating that the working machine 1 is within the range of the monitoring device 30.

Figure 3C:
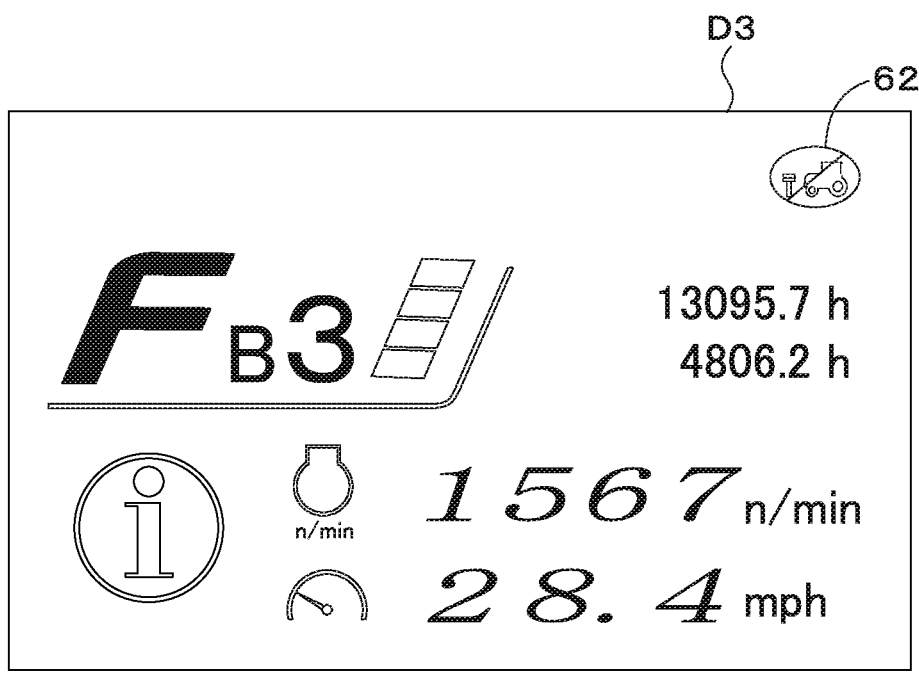
FIG. 3C is a view showing a screen indicating a first warning, which is displayed on the display.

When the working machine 1 is not within the monitoring area, as shown in FIG. 3C, the display 13 displays an icon 62, for example, an icon 62 indicating the first warning, in a portion of the normal screen D1, warning that the working machine 1 is not within the range of the monitoring device 30 (step S18).

For example, the display 13 transitions from the normal screen D1 to the screen D3 including the icon 62 indicating the first warning. This allows the operator to check whether the working machine 1 is within the monitoring area while on board the working machine 1. This allows the operator to easily guide the working machine 1 into the monitoring area, thus improving the effectiveness of the monitoring by the monitoring device 30.

The controller 11 determines that the motor 3 has stopped based on the operator's turning of the engine key and the starter switch 19 outputting a signal to the starter relay 20 to stop the prime mover, or a signal input to the controller 11 from the rotating-speed detector 3*a* (step S19), and based on the received judgment results in step S15, it is determined whether the working device 1 is within the monitoring area (S20).

In detail, the controller 11 obtains a signal from the starter switch 19 or the rotating-speed detector 3*a*. The controller 11 determines whether the prime mover 3 is operating or stopped based on the signal. The controller 11 may be configured to determine that the prime mover 3 has stopped by both the signal obtained from the starter switch 19 and the signal obtained from the rotating-speed detector 3*a*.

When the controller 11 determines that the prime mover 3 has stopped, the controller 11 obtains the result of the determination of the judgment analyzer 36 from the first storage portion 15. Thereby, the controller 11 determines whether the working device 1 is within the monitoring area or not.

Figure 4A:
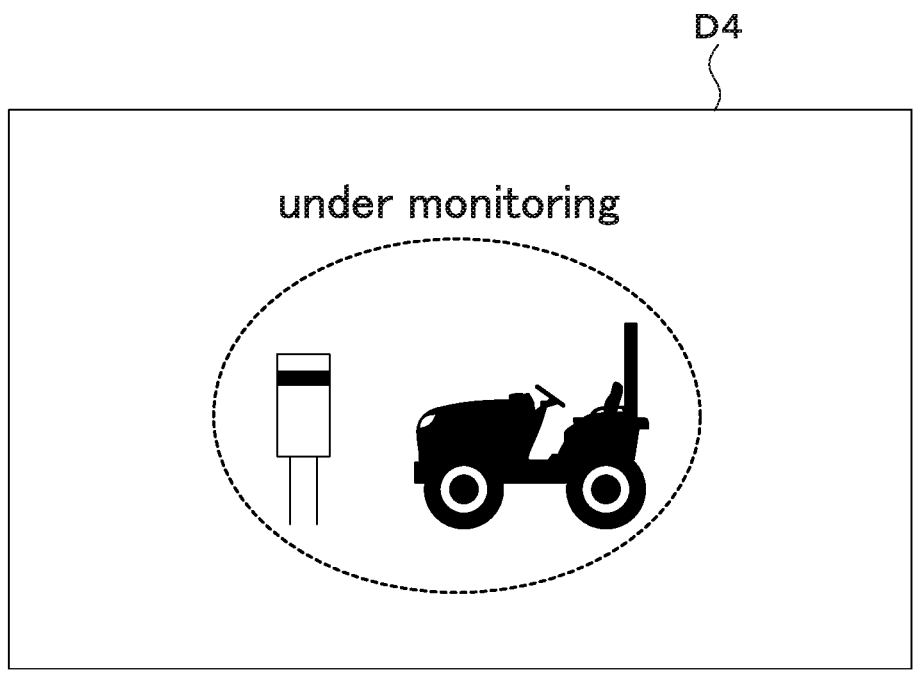
FIG. 4A is a view showing a pop-up screen displayed on the display, which represents the working machine is in the monitoring area.

When the working device 1 is within the monitoring area, the display 13 transitions from the normal screen D1 to the screen D4 showing that the working device 1 is within the range of the monitoring system 30, as shown in FIG. 4A. The monitoring system for the working device 1 shifts to the monitoring mode (step S21).

Figure 4B:
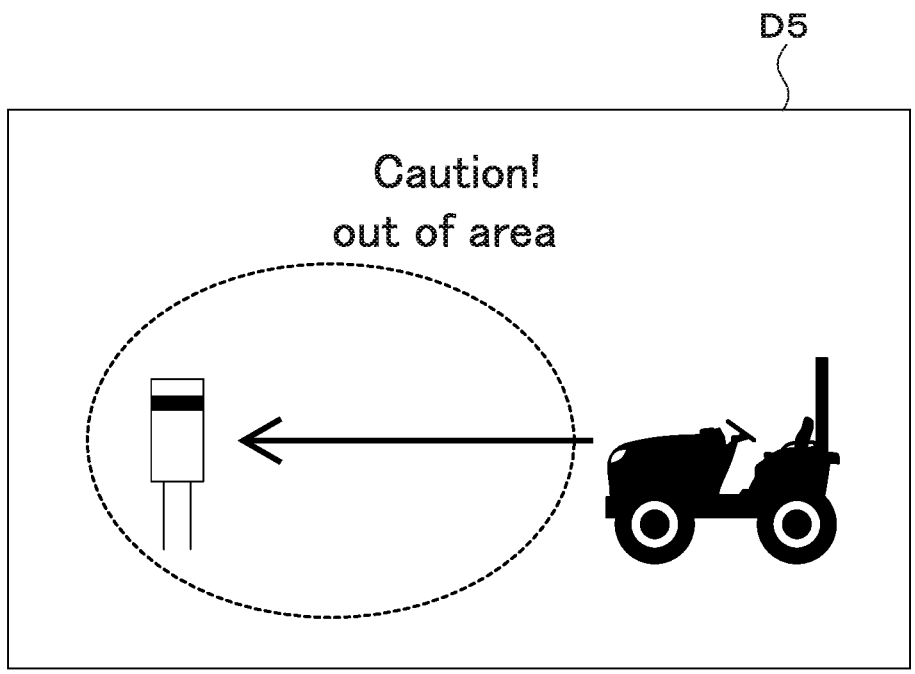
FIG. 4B is a view showing a pop-up screen indicating a second warning, which is displayed on the display.

On the other hand, if the working machine 1 is not within the monitoring area, the display 13 transitions from the normal screen D1 to the warning screen D5 showing a second warning that warns the operator that the working machine 1 is not within the range of the monitoring device 30, as shown in FIG. 4B (step S22).

This allows the operator to recognize again whether or not the working machine 1 is within the monitoring area when the prime mover 3 of the working machine 1 is stopped. This allows the operator to improve recognition of the fact that the working machine 1 is out of the monitoring area if the working machine 1 is out of the monitoring area. The work machine is also stopped (step S23).

Figure 2B:
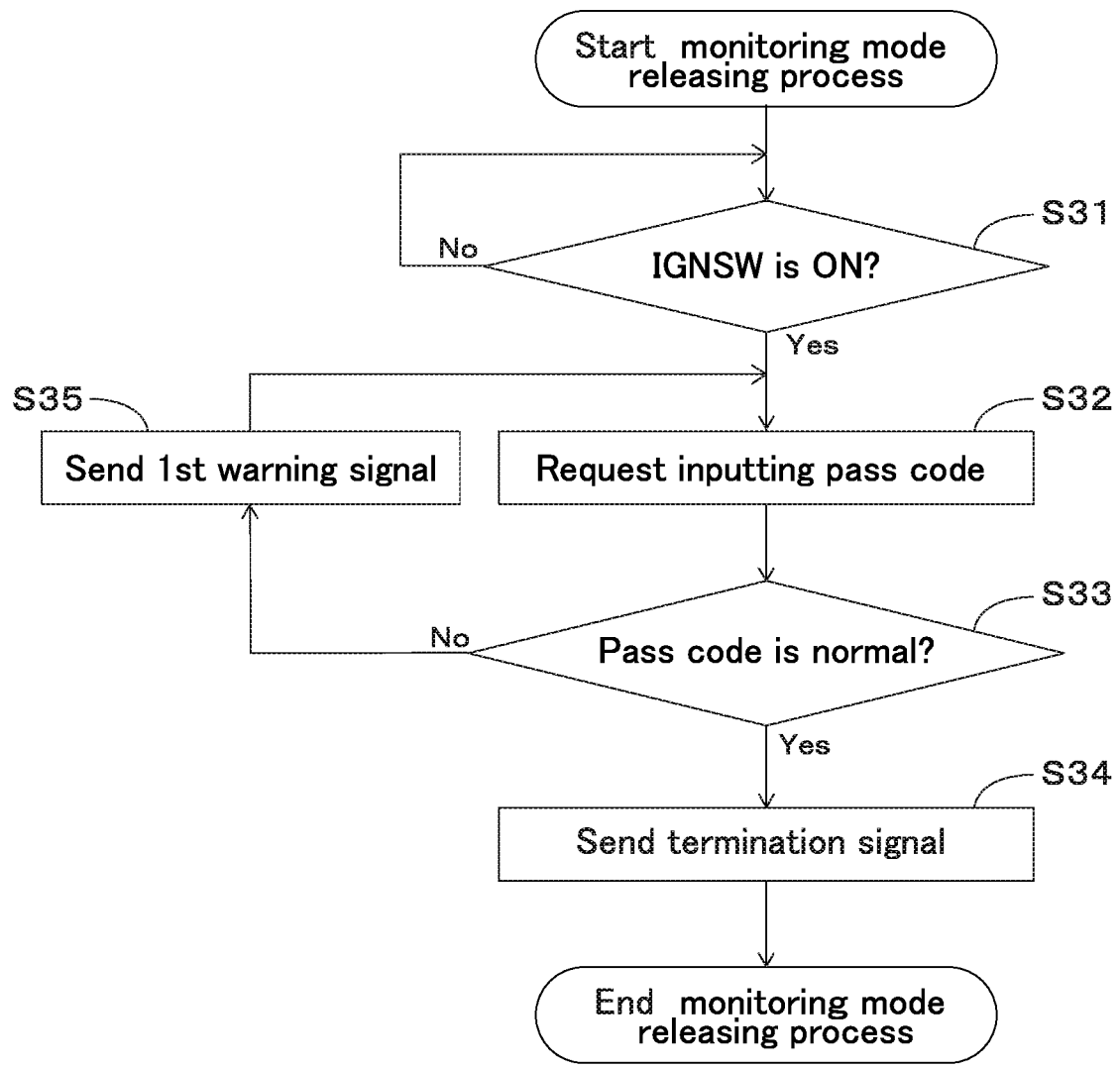
FIG. 2B is a view showing a flow of the monitoring system in the working machine in releasing a monitoring mode.

Next, FIG. 2B will be used to describe the operation of the release process of the monitoring mode in the working device 1.

When the monitoring system for the working machine 1 is in the monitoring mode, when the controller 11 determines that the operator has operated the engine key to turn the engine key and the starter switch 19 has output a signal to the starter relay 20 to start the prime mover or that the prime mover 3 has been started from the rotating-speed detector 3a (step S31), the display 13 displays a request for a pass code input (step S32).

In particular, when the monitoring system for the working device 1 is in the monitoring mode, the controller 11 obtains a signal from the starter switch 19 or the rotating-speed detector 3a. When the controller 11 determines that the prime mover 3 is starting based on the signal, the controller 11 outputs, to the display 13a, signal that the prime mover 3 has started. The display 13 displays a request for a pass code input based on the signal.

When the controller 11 recognizes that the operator operates the input device 14 and that the input pass code is normal (step S33), the instruction controller 11a instructs the monitor 33, via the first and second communication devices 12 and 32, to terminate the monitoring once started (step S34).

In detail, the control device 11 obtains a signal based on the pass code inputted from the input device 14. The control device 11 also acquires information relating to the regular pass code stored in advance in the first storage portion 15. The controller 11 determines whether the pass code is a normal one or not based on the signal obtained from the input device 14 and the information obtained from the first storage portion 15.

When the control device 11 determines that the input pass code is a normal pass code, the instruction controller 11a outputs a termination signal instructing the first communicator 12 to terminate the monitoring once started. The first communicator 12 transmits the termination signal to the second communicator 32.

The second communicator 32 outputs the received termination signal to the monitor 33. When the monitor 33 obtains the termination signal, the monitor 33 terminates the monitoring.

On the other hand, when the controller 11 recognizes that the pass code entered by the operator is not normal (step S33), the first communication device 31 sends a first warning signal to the second communicator 32 (step S35).

Figure 2C:
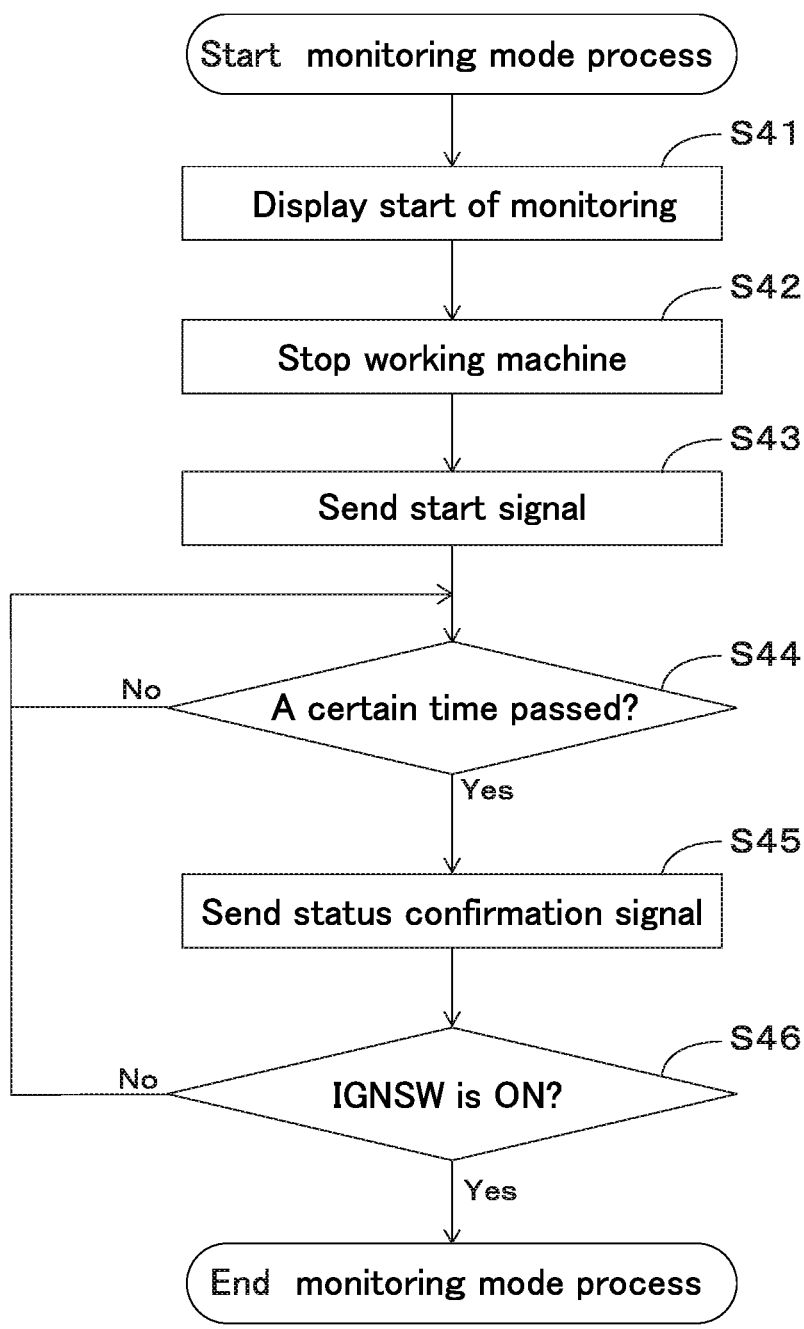
FIG. 2C is a view showing a flow of the monitoring system in the working machine in the monitoring mode.

Next, FIG. 2C will be used to describe the operation of the process of the monitoring mode in the working machine 1.

Figure 5:
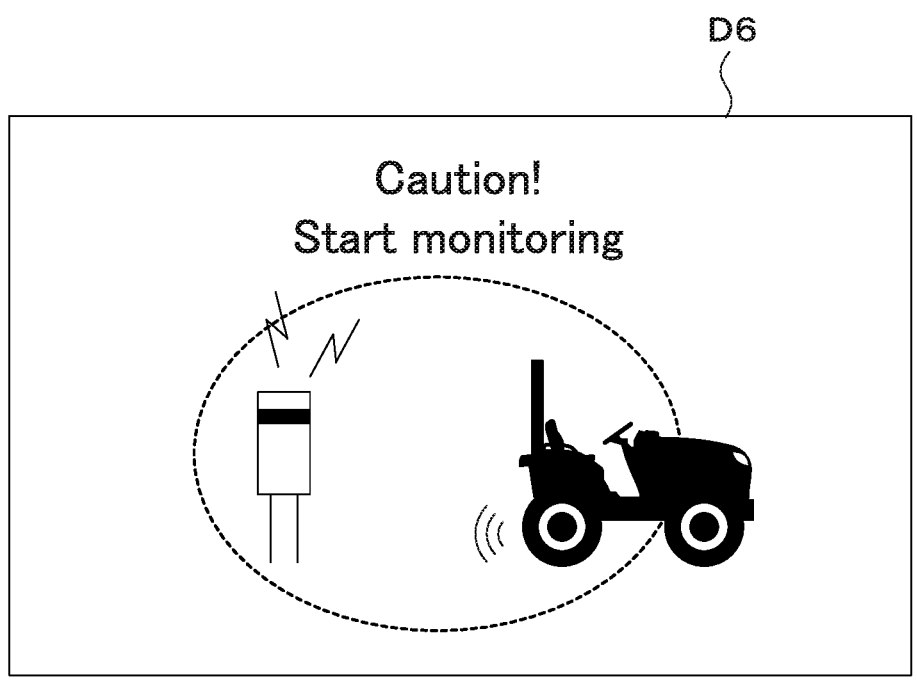
FIG. 5 is a view showing a pop-up screen indicating a monitoring mode starts, which is displayed on the display.

When the monitoring mode is switched to the monitoring mode, the display 13 displays a screen D6 indicating that the monitoring mode has been switched to the monitoring mode as shown in FIG. 5 (step S41).

The controller 11 shifts to background processing, for example, the working machine 1 is stopped (step S42).

The instruction controller 11a instructs the monitor 33 to start monitoring via the first communication device 12 and second communication device (step S43). In particular, a start signal, which is a signal instructing the monitor 33 to start monitoring, is sent from the first communicator 12 to the second communicator 32. When the monitor 33 obtains the start signal, the monitor 33 starts imaging with the imaging portion 33a and obtaining a judgment result from the judgment analyzer 36.

After the monitoring system shifts to the monitoring mode, every time a certain amount of time passes (step S44), a status confirmation signal instructing monitoring by the monitor 33 is sent from the first communicator 12 to the second communicator 32 (step S45).

In particular described, the instruction controller 11a outputs a status confirmation signal instructing the monitoring by the monitor 33 to the first communicator 12 every fixed time. The first communicator 12 transmits the status confirmation signal to the second communicator 32. When the second communicator 32 receives the status confirmation signal, the second communicator 32 outputs the relevant status confirmation signal to the monitor 33.

When the monitor 33 obtains the status confirmation signal, the monitor 33 detects whether or not an abnormality has occurred based on the image captured by the imaging portion 33a and the determination by the judgment analyzer 36 whether or not the working device 1 is within the area that can be monitored.

When the controller 11 determines that the operator has operated the engine key to turn the engine key and the starter switch 19 has output a signal to the starter relay 20 to start the prime mover or that the prime mover 3 has been started from the rotating-speed detector 3a (step S46), the monitoring mode is terminated.

Figure 2D:
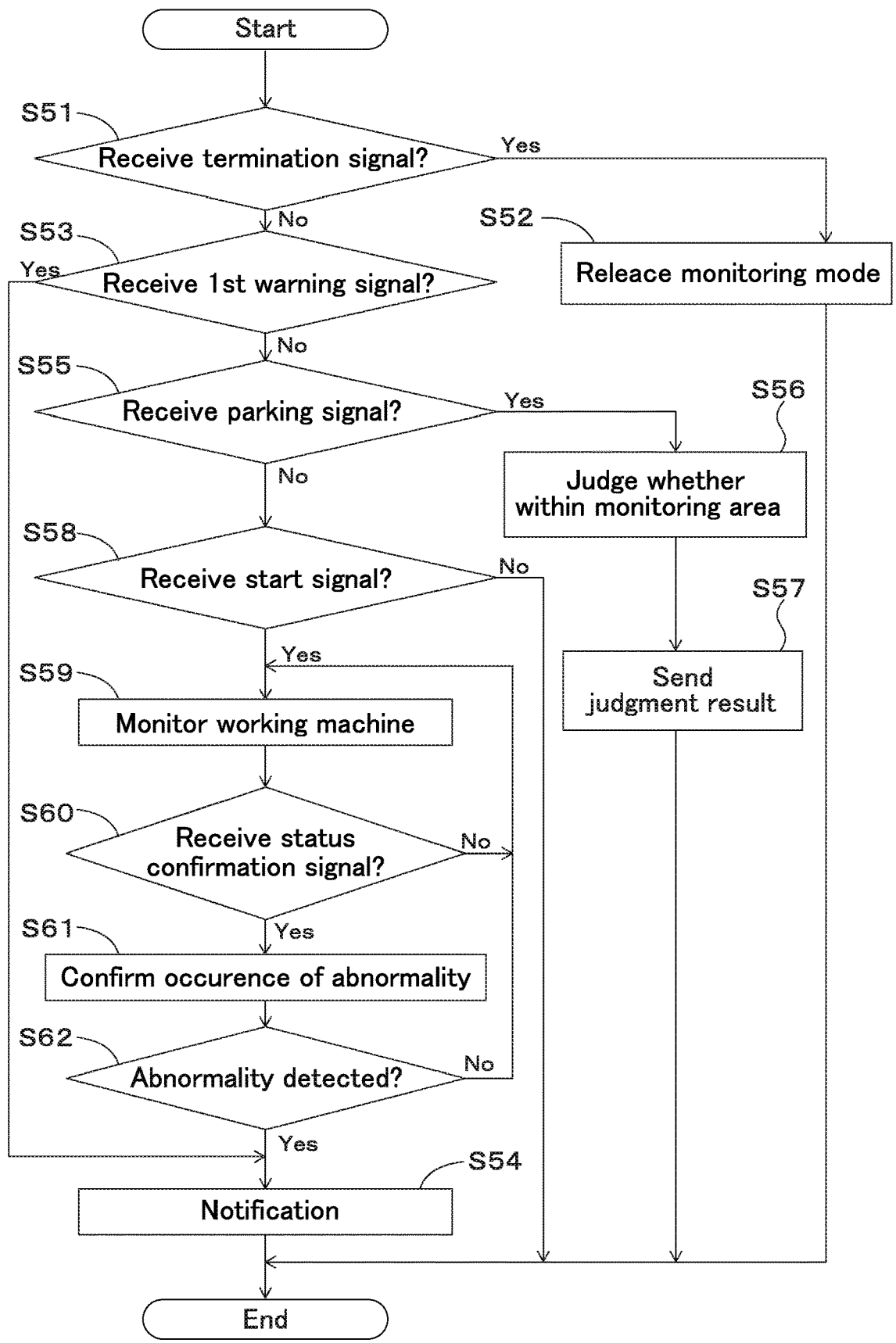
FIG. 2D is a view showing a sequential flow of the monitoring system in a monitor device.

Next, FIG. 2D will be used to describe the operation of a series of processes in the monitoring device 30.

When the second communicator 32 receives a termination signal from the first communicator 12 (step S51), the monitor 33 terminates the monitoring (step S52). In other words, when the second communicator 32 receives a termination signal from the first communicator 12, the monitoring device 30 is released from the monitoring mode and shifts to the normal mode.

On the other hand, when the second communicator 32 does not receive a termination signal from the first communicator 12 and receives the first warning signal (step S53), the second communicator 32 transmits a call signal based on the first warning signal to the third communicator 41 (step S54).

In detail, when the second communicator 32 obtains the first warning signal, the second communicator 32 outputs the first warning signal to the processor portion 31. The processor portion 31 maps the acquired first warning signal to the identification information of the monitoring device 30 as a call signal. The processor portion 31 outputs the call signal to the second communicator 32. The second communicator 32 transmits the acquired call signal to the third communicator 41.

When the second communicator 32 does not receive a termination signal and an abnormality detection signal, but receives a parking signal (step S55), the judgment analyzer 36 determines whether the working machine 1 is in a monitorable area or not (step S56).

The second communicator 32 transmits a signal based on the result of the judgment of the judgment analyzer 36 to the first communicator 12 (step S57).

When the second communicator 32 receives a start signal without receiving any of the termination signal, the abnormality detection signal, or the parking signal (step S58), the monitoring of the working machine 1 is started, that is, the monitoring device 30 shifts to the monitoring mode (S59).

When the second communicator 32 receives a status confirmation signal from the first communicator 12 (step S60), based on the information obtained by the monitor 33, the processor portion 31 determines whether there is an abnormality in the working machine 1 (step S61).

In particular, based on the information acquired by the imaging portion 33a and whether the working machine 1 is within the monitoring area, the decision is made based on the information acquired by the imaging portion 33a and whether or not the working machine 1 is within the monitoring area.

When the processor portion 31 determines that there is an abnormality in the working device 1 (step S62), a signal based on the information determined to be the abnormality is sent from the second communicator 32 to the third communicator 41 (step S54).

In particular, the monitor 33 outputs a second warning signal based on the abnormality with respect to the processor portion 31. The processor portion 31 corresponds with the second warning signal and the identification information of the monitoring device 30, and outputs the signal as a call signal to the second communicator 32. The second communicator 32 transmits the calling signal to the third communicator 41.

The above-described embodiments are illustrative in all respects and are not restrictive. For example, in this embodiment, since the first communicator 12 and the second communicator 32 communicate wirelessly with the first communicator 12 by BLE or the like, the judgment analyzer 36 determines whether the working device 1 is in a monitorable area based on the RSSI.

However, the first communicator 12 and the second communicator 32 may communicate wirelessly by light. For example, the first communicator 12 and the second communicator 32 each transmit a signal with a light emission pattern.

In the case, the judgment analyzer 36 determines whether or not the working machine 1 is in a monitorable area based on the intensity of the light obtained by the second communicator 32 from the first communicator 12 and a threshold value stored in the second storage portion 35 in advance.

This eliminates the need for a new configuration, since the configuration described above can be applied to the lamp provided by the current working machine 1 as the first communicator 12. For this reason, the monitoring system for the working device 1 as described above can be easily introduced.

The information including the threshold values stored in the first storage portion 15 may be configured to allow the settings to be changed by operating the display 13 or the input device 14. The information including the threshold values stored in the second storage portion 35 may be configured to allow the settings to be changed from a mobile terminal or the like with relatively high computing power, including a PC, via the server 40.

In addition, in the above-described embodiment, the second communicator 32 transmits the calling signal to the server 40 when it receives the first or second warning signal, but may be configured to warn the user by means of the warning portion, if the monitoring device 30 is provided with a warning portion. In such a case, the warning portion may be, for example, an alarm that warns the user with a warning sound or with a light.

As described above, the monitoring system for the working device 1 is provided with a first communicator 12, a second communicator 32, a monitor 33, a first communicator 12, a judgment analyzer 36, and an instruction controller 11a. This enables the working device 1 to be monitored after determining whether the working device 1 is within the monitoring area of the monitoring device 30.

Therefore, the working device 1 can be monitored when the working device 1 is within the monitoring area, that is, when the monitoring of the monitoring device 30 is effective.

If the judgment analyzer 36 determines that the working machine 1 is within the monitoring area and the traveling device 5 has stopped, the instruction controller 11a instructs the monitor 33 to monitor the working machine 1. This allows the monitoring by the monitor 33 of the monitoring device 30 to begin once the working device 1 is within the monitoring area and the running of the working device 1 has stopped.

For this reason, even when the working device 1 stops traveling and working is interrupted, the monitoring of the working device 1 by the monitoring device 30 can be enabled without the need for any special operation.

If the judgment analyzer 36 determines that the working machine 1 is within the monitoring area and the working device 4 is stopped, the instruction controller 11a instructs the monitor 33 to monitor the working machine 1. This allows the monitoring by the monitor 33 of the monitoring device 30 to begin once the working device 1 is within the monitoring area and the working device 1 has stopped traveling and working.

Thus, even when the operator stops the working device 1 in the agricultural field 50 and moves away from the working device 1, the monitoring of the working device 1 by the monitoring device 30 can be enabled without requiring any special operation.

If the judgment analyzer 36 determines that the working machine 1 is within the monitorable area and the prime mover 3 provided in the working machine 1 is operating, the instruction controller 11a instructs the monitor 33 to terminate the monitoring once started. This allows the monitoring by the monitoring device 30 to terminate when the operator activates the prime mover 3 of the working machine 1, that is, when the operator is in possession of a regular engine key.

This prevents the authorized operator of the working machine 1 from being falsely reported by the monitoring device 30, and if the operator is an authorized operator, the monitoring mode can be easily terminated.

The working device 1 has an input device 14 and a control device 11, and the first communicator 12 outputs a signal to the second communicator 32 in which the indicator 11a instructs the second communicator 32 to terminate the monitoring of the monitor 33 when the control device 11 determines that the pass code entered into the input device 14 is normal.

This enables the termination of the monitoring mode to prohibit the termination of the monitoring mode by a person other than an authorized operator, since the termination of the monitoring mode requires a regular engine key and a regular pass code.

The working machine 1 has the display 13, and the display 13 displays the first warning, which is the result of the decision of the judgment analyzer 36. This allows the operator to check whether the working machine 1 is within the monitoring area while on board the working machine 1. This allows the operator to easily guide the working machine 1 into the monitoring area, thus improving the effectiveness of the monitoring by the monitoring device 30.

If the judgment analyzer 36 determines that the working machine 1 is not in the monitored range and the prime mover 3 provided in the working machine 1 is stopped, the display 13 displays a second warning that is the result of the judgment analyzer 36 and is different from the first warning.

This allows the operator to recognize again whether the working machine 1 is within the monitoring area when the prime mover 3 of the working machine 1 has been stopped. Thus, the operator can improve his or her recognition of the fact that the working device 1 is out of the monitoring area if the working device 1 is out of the monitoring area.

The second communicator 32 outputs a signal based on the abnormality to the outside when the monitor 33 detects the abnormality. Thereby, if an abnormality occurs in the working device 1 within the monitoring area, a security guard or a monitoring drone can be called from the external network.

In addition, a mobile terminal or other device possessed by an authorized operator can be notified of the abnormality. Therefore, even if an abnormality occurs, such as an unauthorized operator operating the working device 1 or an intruder stealing the working device 1, it is possible to warn against such an act.

In addition, the second communicator 32 outputs a signal to the outside to report that the pass code entered into the input device 14 is not normal if the control device 11 determines that the pass code entered into the input device 14 is not normal. This allows a security guard or surveillance drone to be called from an external network if the pass code entered into the input device 14 is incorrect.

In addition, a mobile terminal or other device possessed by an authorized operator can be notified of the abnormality. Thus, if an unauthorized operator attempts to operate the working device 1 or an intruder attempts to steal the working device 1, and an unauthorized pass code is entered into the input device 14, it is possible to warn against such an action.

The monitoring device 30 has at least one of the following: the air temperature sensor 34*a*, the humidity sensor 34*b*, the light intensity sensor 34*c*, and the wind speed sensor 34*d*. This allows the working device 1 to be monitored by using a field server that monitors the condition of the agricultural field 50.

The first communicator 12 and the second communicator 32 output and receive signals by radio waves. Thereby, the configuration described above does not require a new configuration because the first communicator 12, which is the wireless communication means provided by the current working device 1, can be applied. For this reason, the monitoring system for the working device 1 described above can be easily introduced.

The first communicator 12 and the second communicator 32 output and receive signals by means of optical signals. In this manner, the configuration described above does not require a new configuration, since the lamp provided by the current working device 1 can be applied as the first communicator 12. For this reason, the monitoring system for the working device 1 as described above can be easily introduced.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A monitoring system for a working machine, comprising:
    a first communication device, including at least a processor, configured to communicate in wireless, the first communication device being provided on the working machine including a working device and a traveling device; and
    a monitoring device, including at least a processor and a monitor, configured to:
    communicate with the first communication device in wireless, the monitoring device being installed in an agricultural field;
    monitor the agricultural field;
    judge whether the working machine is in a monitoring area based on intensities of signals of the first communication device and the monitoring device; and
    an instruction controller, including at least a processor, configured to instruct the monitor to start monitoring when the monitoring device determines that the working machine is in the monitoring area of the monitor,
    wherein the working machine includes:
    a display to display a state of the working machine, and
    the display displays a first warning that represents a judgment result of the monitoring device, and
    wherein the display displays a second warning that represents the judgment result of the monitoring device separately from the first warning when the monitoring device determines that the working machine is out of the monitoring area and a prime mover provided in the working machine stops.

2. The monitoring system for the working machine according to claim 1, wherein
    the instruction controller instructs the monitor to start monitoring when the monitoring device determines that the working machine is in the monitoring area and the traveling device stops.

3. The monitoring system for the working machine according to claim 2, wherein
    the instruction controller instructs the monitor to start monitoring when the monitoring device determines that the working machine is in the monitoring area and the working device stops.

4. The monitoring system for the working machine according to claim 1, wherein
    the instruction controller instructs the monitor to stop monitoring when the monitoring device determines that the working machine is in the monitoring area and the prime mover provided in the working machine is in operation.

5. The monitoring system for the working machine according to claim 2, wherein
    the instruction controller instructs the monitor to stop monitoring when the monitoring device determines that the working machine is in the monitoring area and the prime mover provided in the working machine is in operation.

6. The monitoring system for the working machine according to claim 3, wherein
    the instruction controller instructs the monitor to stop monitoring when the monitoring device determines that the working machine is in the monitoring area and the prime mover provided in the working machine is in operation.

7. The monitoring system for the working machine according to claim 1, wherein
the working machine includes:
an input device to which a pass code is input; and
a controller, which includes the instruction controller, to judge whether the pass code input to the input device is correct, and
the first communication device outputs, to the monitoring device, a signal ordering the instruction controller to instruct the monitor to stop monitoring when the controller determines that the pass code input to the input device is correct.

8. The monitoring system for the working machine according to claim 2, wherein
the working machine includes:
an input device to which a pass code is input; and
a controller, which includes the instruction controller, to judge whether the pass code input to the input device is correct, and
the first communication device outputs, to the monitoring device, a signal ordering the instruction controller to instruct the monitor to stop monitoring when the controller determines that the pass code input to the input device is correct.

9. The monitoring system for the working machine according to claim 3, wherein
the working machine includes:
an input device to which a pass code is input; and
a controller, which includes the instruction controller, to judge whether the pass code input to the input device is correct, and
the first communication device outputs, to the monitoring device, a signal ordering the instruction controller to instruct the monitor to stop monitoring when the controller determines that the pass code input to the input device is correct.

10. The monitoring system for the working machine according to claim 1, wherein
when the monitor detects abnormality, the monitoring device outputs a signal based on the abnormality to outside.

11. The monitoring system for the working machine according to claim 7, wherein
the monitoring device outputs, to outside, a signal notifying that the pass code is incorrect when the controller determines that the pass code input to the input device is incorrect.

12. The monitoring system for the working machine according to claim 1, wherein
the monitoring device includes at least one of:
a temperature sensor to measure temperature in the agricultural field;
a humidity sensor to measure humidity in the agricultural field;
a light intensity sensor to measure intensity of light in the agricultural field; and
a wind speed sensor to measure a speed of wind in the agricultural field.

13. The monitoring system for the working machine according to claim 1, wherein
the first communication device and the monitoring device output and receive the signal with a radio wave.

14. The monitoring system for the working machine according to claim 1, wherein
the first communication device and the monitoring device output and receive the signal with an optical signal.

15. A monitoring system for a working machine, comprising:
a first communication device, including at least a processor, configured to communicate in wireless, the first communication device being provided on the working machine including a working device and a traveling device;
a monitoring device, including at least a processor and a monitor, configured to:
communicate with the first communication device in wireless, the monitoring device being installed in an agricultural field;
monitor the agricultural field;
judge whether the working machine is in a monitoring area based on intensities of signals of the first communication device and the monitoring device; and
an instruction controller, including at least a processor, configured to instruct the monitor to start monitoring when the monitoring device determines that the working machine is in the monitoring area of the monitor, wherein
the instruction controller instructs the monitor to stop monitoring when the monitoring device determines that the working machine is in the monitoring area and a prime mover provided in the working machine is in operation,
wherein the working machine includes:
a display to display a state of the working machine, and
the display displays a first warning that represents a judgment result of the monitoring device, and
wherein the display displays a second warning that represents the judgment result of the monitoring device separately from the first warning when the monitoring device determines that the working machine is out of the monitoring area and the prime mover provided in the working machine stops.

16. The monitoring system for the working machine according to claim 15, wherein
the working machine includes:
an input device to which a pass code is input; and
a controller, which includes the instruction controller, to judge whether the pass code input to the input device is correct, and
the first communication device outputs, to the monitoring device, a signal ordering the instruction controller to instruct the monitor to stop monitoring when the controller determines that the pass code input to the input device is correct.

17. The monitoring system for the working machine according to claim 16, wherein
the monitoring device outputs, to outside, a signal notifying that the pass code is incorrect when the controller determines that the pass code input to the input device is incorrect.

* * * * *